United States Patent [19]

Yaegashi et al.

[11] 4,450,528

[45] May 22, 1984

[54] METHOD AND APPARATUS FOR CONTROLLING THE OPERATION OF AN INTERNAL COMBUSTION ENGINE

[75] Inventors: Takehisa Yaegashi, Mishima; Keiji Aoki; Kenzo Hashikawa, both of Susono, all of Japan

[73] Assignee: Toyota Jidosha Kogyo Kabushiki Kaisha, Toyota, Japan

[21] Appl. No.: 248,444

[22] Filed: Mar. 27, 1981

[30] Foreign Application Priority Data

Mar. 31, 1980 [JP]  Japan ................................. 55-40164

[51] Int. Cl.³ ........................... F02B 3/12; F02P 17/00
[52] U.S. Cl. ............................... 364/431.05; 123/417; 123/480; 364/431.11
[58] Field of Search ...................... 364/431.04, 431.05, 364/431.06; 123/416, 417, 418, 424, 425, 427, 480

[56] References Cited

U.S. PATENT DOCUMENTS

| | | | |
|---|---|---|---|
| 4,157,699 | 6/1979 | Mori | 123/424 X |
| 4,181,944 | 1/1980 | Yamauchi et al. | 364/431.06 |
| 4,351,297 | 9/1982 | Suematsu | 123/424 X |

Primary Examiner—Felix D. Gruber
Attorney, Agent, or Firm—Cushman, Darby & Cushman

[57] ABSTRACT

A calculation coefficient used in the arithmetic calculation for controlling the operation of an internal combustion engine is determined by using at least one coefficient stored in a fixed storage, in accordance with a binary number electrical signal. This signal is obtained by converting a variable instruction voltage from a voltage instructing device which can be easily operated. Therefore, by operating the voltage instructing device, the calculation coefficient used in the arithmetic calculation can be very easily changed within a very short period of time, without requiring any additional expense.

10 Claims, 8 Drawing Figures

METHOD AND APPARATUS FOR CONTROLLING THE OPERATION OF AN INTERNAL COMBUSTION ENGINE

BACKGROUND OF THE INVENTION

The present invention relates to a method of and apparatus for controlling the operation of an internal combustion engine which is equipped with a digital calculation unit.

A digital arithmetic unit such as microcomputer has frequently been employed as an arithmetic unit for internal combustion engines of the type which detect various data representing the operating conditions of the internal combustion engine, such as running speed, amount of air intake, pneumatic pressure of the intake manifold, air-fuel ratio condition, water temperature, temperature of the air intake, battery voltage, opening degree of a throttle valve and atmospheric pressure, and which performs predetermined arithmetic calculations based upon the detected data, in order to control various actuators in the ignition system, fuel feeding system, and air-fuel ratio control system. The digital arithmetic unit of this type stores various data for use in the arithmetic calculation (such as arithmetic constants, reference values, coefficients, and characteristic data used for the arithmetic calculation), in a fixed storage such as read-only memory (ROM) which holds the data even after the power supply of the engine has been turned off.

With the conventional art, however, a problem develops when it is required to change the data used in the arithmetic calculation and stored in the ROM as a result of a design modification of the engine or re-adjustment during the manufacturing steps.

When the ROM is a masked ROM, it is necessary to replace not only the ROM to change the stored data but also to change the mask patterns during the steps of manufacturing the ROM. To change the data, therefore, a period of at least two to three months and tremendous expense are required.

Even when there is used a programmable ROM (PROM) such as a fusing-type ROM which enables the data to be written in only once, the ROM must be replaced to write the new data and requires considerable expense.

The data can be quickly changed if there is used an erasable programmable ROM (EPROM) which permits the stored contents to be erased. The EPROM, however, is expensive, and presents a probability that the stored content may be extinguished with the lapse of time. The EPROM, therefore, has a problem with regard to reliability.

If the data is generated by a discrete circuit, the data can be changed simply by changing the circuit constant of the discrete circuit. This, however, causes the discrete portion to become complex, while presenting such problems as decreased reliability that may be caused by faults and defects, cumbersome adjustment, and increased manufacturing cost.

SUMMARY OF THE INVENTION

It is, therefore, an object of the present invention to provide a method of and apparatus for controlling the operation of an internal combustion engine whereby the data (calculation constants or the like) used in the arithmetic calculation can be changed within a very short period of time, without requiring any additional expense.

According to the present invention, a voltage instructing means is employed to generate a variable instruction voltage, and this voltage is converted into a first electrical signal in the form of a binary number: A calculation is then determined coefficient in accordance with the value of the first electrical signal, this determining being performed by arithmetically or logically processing the coefficient stored in the fixed storage means, in accordance with the first electrical signal. The actual condition of the engine is then detected and at least one second electrical signal in the form of a binary number is produced, which signal indicates the detected condition of the engine. At least one value corresponding to a setting of means for adjusting the operation of the engine is calculated using the second electrical signal and the calculation constant by a digital computer which is constituted to calculate the value from functions indicating a desired relationship between the engine condition and the adjusting means. The operation of the engine is controlled by the adjusting means in response to the calculated value.

The above and other related objects and features of the present invention will be apparent from the description of the present invention set forth below, with reference to the accompanying drawings, as well as from the appended claims.

DETAILED DESCRIPTION OF THE PREFERRED EMBODIMENTS

Figure 1:
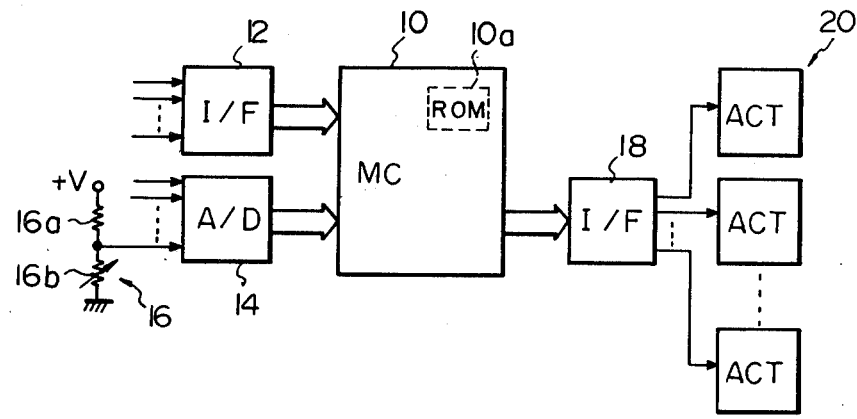
FIG. 1 is a schematic view illustrating the fundamental concept of the present invention.

Referring to FIG. 1, reference numeral 10 denotes a microcomputer mounted on an internal combustion engine, 12 denotes an input interface for digital sensors which produce digital signals among sensors for detecting the operating conditions of the engine, and 14 denotes an analog-to-digital converter (A/D converter) which is connected to analog sensors that produce analog signals, and which converts the output signals of the analog sensors into digital signals. A circuit 16 for forming a variable instruction voltage is connected to an input terminal of the A/D converter 14. In FIG. 1, the circuit 16 for forming a variable instruction voltage consists of a fixed resistor 16a and a variable resistor 16b in series that are connected across a constant voltage supply and ground. In FIG. 1, furthermore, reference numeral 18 denotes an output interface. The microcomputer 10 is connected via the output interface 18 to various actuators 20 for controlling the operating conditions of the engine.

Figure 2A:
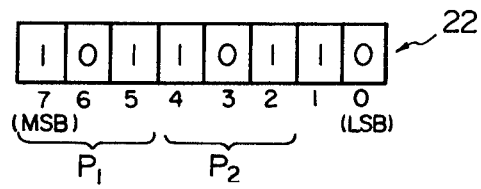
FIGS. 2a and 2b are views illustrating relationships between constant information and parameters.

Electric signals representing various operating conditions of the internal combustion engine are received by the microcomputer 10 via the input interface 12 or the A/D converter 14. Based upon a program which has been stored beforehand in a ROM 10a, the microcomputer 10 calculates, utilizing the above-mentioned electric signals, the control data which correspond to control settings of the respective actuators 20. While the control data are being calculated, the data used in the arithmetic calculation (constant information) stored beforehand in the ROM 10a are utilized, i.e., arithmetic constants, reference values, coefficients and characteristic data are used. According to the present invention, however, the data used in the arithmetic calculation can be changed by an instruction voltage which is obtained from the circuit 16. Namely, an instruction voltage is converted into a digital instruction data by the A/D converter 14, and is used as a parameter for determining the data which is used in the arithmetic calculation. FIG. 2a illustrates a relationship between the digital instruction data and the parameter. When an instruction voltage is converted into a digital instruction data 22 consisting of eight bits, the data consisting of six upper bits is divided as a parameter $P_1$ and a parameter $P_2$ each consisting of three bits to determining the data used in the arithmetic calculation. The lower two bits inclusive of LSB are not used since they contain large errors.

Two methods can be contrived to determine the data used in the arithmetic calculation by using the parameter $P_1$ or $P_2$. According to a first method, the parameter is regarded as address data, and the stored content corresponding to the address is used as the data for the arithmetic calculation. Namely, a plurality of setting values are stored in the ROM 10a for each kind of data used in the arithmetic calculation, and the address is specified by the parameter to take out a desired setting value. Since each of the parameters $P_1$ and $P_2$ consists of three bits, there exist eight setting values $A_1$ to $A_8$ for each kind of data used in the arithmetic calculation as tabulated below.

TABLE 1

| Parameter | | | Setting value |
|---|---|---|---|
| 0 | 0 | 0 | $A_1$ |
| 0 | 0 | 1 | $A_2$ |
| 0 | 1 | 0 | $A_3$ |
| 0 | 1 | 1 | $A_4$ |
| 1 | 0 | 0 | $A_5$ |
| 1 | 0 | 1 | $A_6$ |
| 1 | 1 | 0 | $A_7$ |
| 1 | 1 | 1 | $A_8$ |

According to a second method, the parameter is treated as a physical quantity, and the constants that are stored in the ROM 10a for each kind of data used in the arithmetic calculation and the parameter $P_1$ or $P_2$ are subjected to the arithmetic calculation such as addition, subtraction, multiplication or division, to obtain a setting value. Even with this method, it is possible to form eight setting values when the parameter consists of three bits.

Figure 2B:
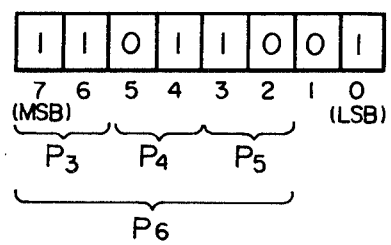

The foregoing description has dealt with the case when the parameter consists of three bits. As shown in FIG. 2b, however, the parameters of the present invention may consist of two bits as indicated by $P_3$ to $P_5$, or may consist of six bits as indicated by $P_6$, or may otherwise consist of bits of any other numbers. With the parameters $P_3$ to $P_5$ each consisting of two bits, however, the number of the settings will be four, and with the parameter $P_6$ consisting of six bits, the number of the settings will be sixty four.

The instruction voltage from the circuit 16 may be converted into digital data consisting of bits of a number which is different from eight, i.e., the instruction voltage may be converted into digital data consisting of 12 bits, 16 bits, or the like. The number of the bits will be determined depending upon bit construction of the A/D converter 14 and furthermore of the microcomputer 10.

According to the present invention constructed as mentioned above, the instruction voltage from the circuit 16 can be simply changed to vary the data used in the arithmetic calculation. Therefore, the ROM need not be replaced each time, and the data used in the arithmetic calculation can be varied very easily and within very short periods of time, requiring a minimum of cost. Furthermore, since the above data can be varied by changing the instruction voltage in an analog manner, the present invention can be put into practice without increasing the input terminals of the control device which includes A/D converter 14, microcomputer 10, and the like.

Although the embodiment of FIG. 1 employed only one circuit 16 for forming a variable voltage, any number of circuits 16 may be provided depending upon the number of data used in the arithmetic calculations that may be varied.

The invention will be illustrated below in further detail with reference to a concrete embodiment.

Figure 3:
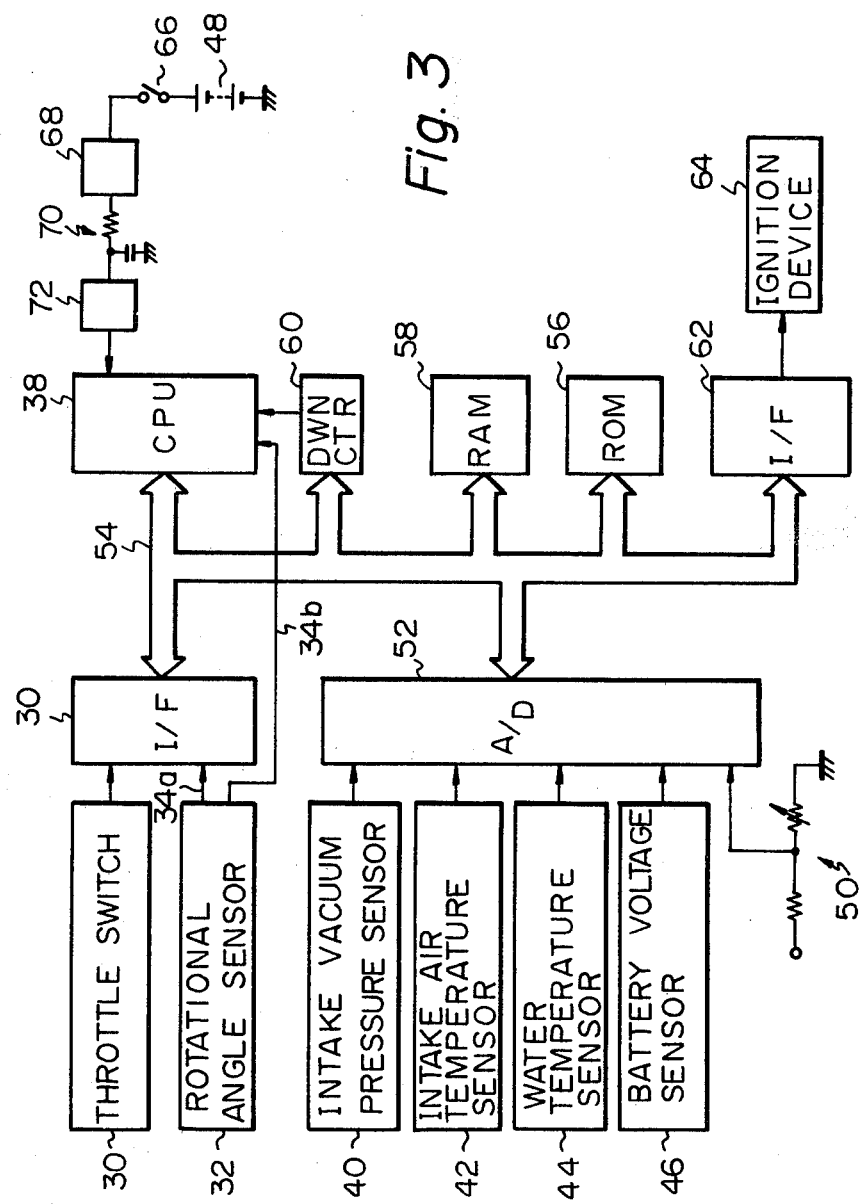
FIG. 3 is a block diagram illustrating an embodiment according to the present invention.

FIG. 3 is a block diagram of a control device when the present invention is adapted to control the ignition timing of the internal combustion engine, especially to control the ignition timing when the engine is in an idling condition. In FIG. 3, reference numeral 30 denotes a throttle switch which detects the state when the throttle valve of the internal combustion engine that is not shown is fully closed, and 32 denotes a rotational angle sensor which generates a TDC pulse at each time the crank-shaft rotates to the TDC (top dead center) position, i.e., which generates a TDC pulse at each crankshaft rotation of 120° when the engine is a four-cycle six-cylinder type or at each crankshaft rotation of 180° when the engine is a four-cycle four-cylinder type, and which further generates a pulse at each time the crankshaft has rotated by 30°. The throttle switch 30 and an output line 34a of TDC pulses of the rotational angle sensor 32 are connected to an input interface 36. An output line 34b of 30-degree pulses of the rotational angle sensor 32 is connected to an interrupt input port of a central processing unit (CPU) 38 which consists of a microprocessor.

In FIG. 3, furthermore, reference numeral 40 denotes an intake vacuum pressure sensor for detecting the intake vacuum pressure of the engine, 42 denotes an intake air temperature sensor for detecting the temperature of the air intaken into the engine, 44 denotes a water temperature sensor for detecting the temperature of the coolant of the engine, 46 denotes a battery voltage sensor for detecting the terminal voltage of a battery 48, and 50 denotes a circuit for forming a variable instruction voltage, which produces an instruction voltage like the circuit 16 for forming a variable instruction voltage illustrated in FIG. 1. These sensors 40, 42, 44, 46 and the circuit 50 are connected to an A/D converter 52 which contains an analog multiplexer, whereby their outputs are subjected to the analog-to-digital conversion.

The input interface 36 and the A/D converter 52 are connected, via a common bus 54, to CPU 38, a ROM 56 and a random access memory (RAM) 58 which constitute a major portion of the microcomputer, and are further connected to a down counter 60 for adjusting the ignition timings and to an output interface 62. The output interface 62 is connected to an ignition device 64 of the engine.

The ROM 56 stores various programs for executing the arithmetic calculations as will be mentioned later, and stores eight setting values at predetermined regions as tabulated below, those values are related to predetermined data used in the arithmetic calculation, namely, those values, are related, in this embodiment, to the fixed angle advancement when the engine is in an idling condition.

TABLE 2

| Address displacement from the initial address | | | Fixed angle advancement |
|---|---|---|---|
| 0 | 0 | 0 | 0° |
| 0 | 0 | 1 | 2° |
| 0 | 1 | 0 | 3° |
| 0 | 1 | 1 | 4° |
| 1 | 0 | 0 | 5° |
| 1 | 0 | 1 | 6° |
| 1 | 1 | 0 | 8° |
| 1 | 1 | 1 | 10° |

Figure 4A:
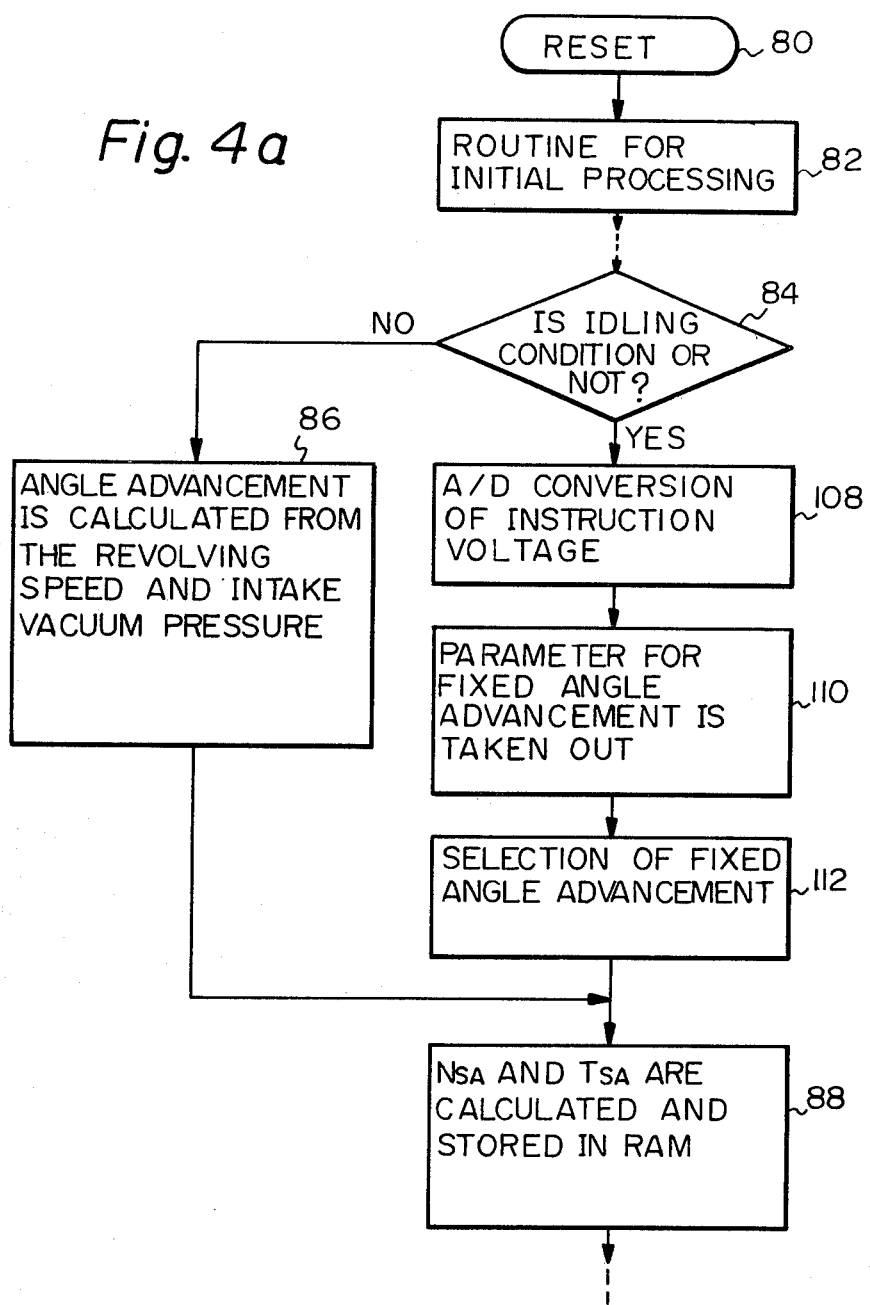
FIGS. 4a, 4b and 4c are flow charts illustrating calculation processes of the embodiment in FIG. 3.
Figure 4B:
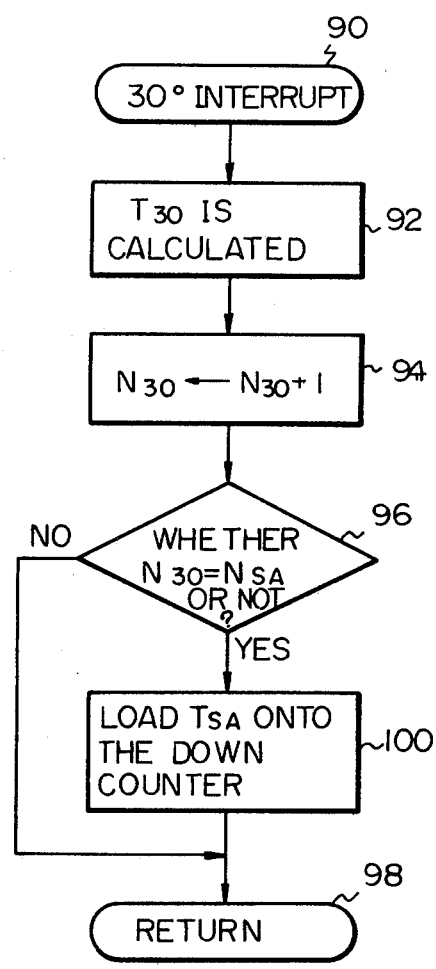
Figure 4C:
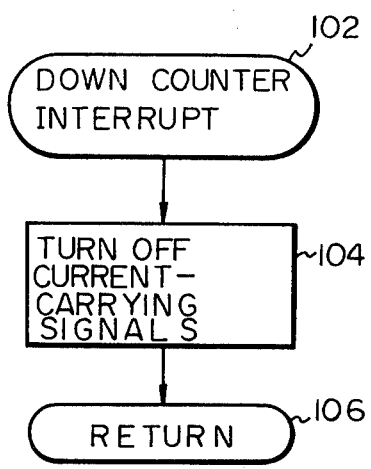
Figure 5:
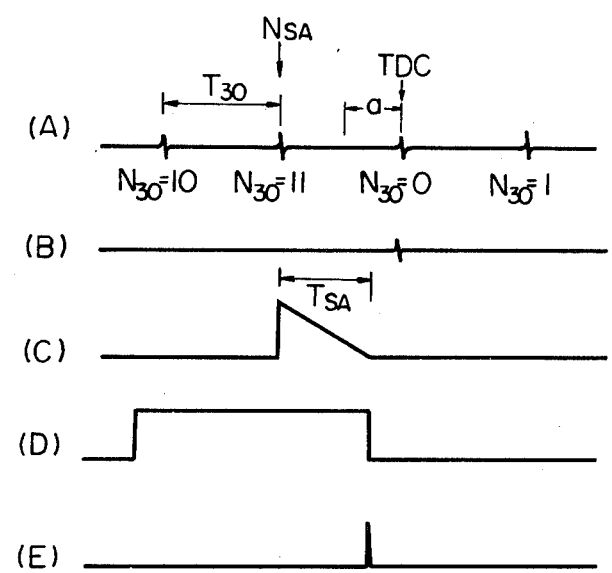
FIG. 5 is a time chart illustrating the operation of the embodiment in FIG. 3.

FIGS. 4a, 4b and 4c illustrate flow charts of a program for executing the arithmetic calculation according to an embodiment of the present invention, and FIG. 5 is a time chart of the circuit of FIG. 3. Operation of the embodiment will now be illustrated below in conjunction with these drawings.

When the ignition switch 66 shown in FIG. 3 is turned on, and an initial reset signal is applied to the CPU 38 via a constant-voltage supply 68, an integration circuit 70 and a Schmidt trigger circuit 72, the CPU 38 executes the initial routine and the main routine that are shown in FIG. 4a. First, when the reset signal is applied at a point 80, the program proceeds to a point 82. At the point 82, the CPU 38 executes the routine for initial processing, i.e., at the point 82, the CPU 38 initializes the contents in the RAM 58 and in the interfaces 36 and 62, and thereafter the main routine is executed. At a point 84, during the execution of the main routine, the CPU 38 examines the state of the throttle switch 30, and determines whether the throttle valve is fully closed or not and, hence, determines whether the engine is in the idling condition or not. When the engine is not in the idling condition, the program proceeds to a point 86 where the angle advancement is calculated in a customary manner based upon the running speed of the engine which is obtained from 30-degree pulses from the rotational angle sensor 32 and the intake vacuum pressure obtained from the intake vacuum pressure sensor 40. At the point 86, the correction is further effected to the calculated angle advancement, based upon the temperature of the intake air, temperature of the coolant, and battery voltage that are fed from the respective sensors 42, 44 and 46, thereby a value a for advancing the angle is determined. Then, at a point 88, the CPU 38 calculates number $N_{SA}$ of 30-degree pulses by which the down counter 60 initiates the counting operation, and further calculates a value $T_{SA}$ which is to be supplied to the down counter 60, i.e., calculates a value that corresponds to the angle advancement, based upon the following relations. Thereafter, the CPU 38 stores the calculated values in the predetermined regions of the RAM 58, and further executes other processing in the main routine.

$$N_{SA} = \frac{360° - a°}{30°}$$

-continued $$T_{SA} = \frac{360° - a° - N_{SA} \times 30°}{30°} \times T_{30}$$

where $N_{SA}$ represents only an integral part, and a decimal part obtained in the above calculation is ignored. Further, $T_{30}$ denotes a period of 30-degree pulse from the rotational angle sensor 32. The period $T_{30}$ is calculated in the routine for processing 30-degree interrupt illustrated in FIG. 4b, and is stored in a predetermined region in the RAM 58.

The CPU 38 executes the interrupt processing of FIG. 4b at every time the 30-degree pulse is applied via the line 34b. That is, when a 30-degree interrupt takes place at a point 90, the CPU 38 measures the period of interrupt (period of 30-degree pulse) $T_{30}$, and stores the measured value in the RAM 58, at a point 92, then at a point 94, the CPU 38 increases $N_{30}$ by one, according to the algebraic expression of $N_{30} \leftarrow N_{30}+1$. The $N_{30}$ will be cleared at each time the TDC pulse is produced, and indicates how many times the 30-degree pulses were generated after the TDC. The CPU 38 then judges at a point 96 whether $N_{30}$ is in agreement with $N_{SA}$ or not. When they are not in agreement, the program proceeds to a point 98 where the processing of interrupt is completed. When they are in agreement, or when $N_{SA} = 11 = N_{30}$ as shown in the diagram (A) of FIG. 5, the program proceeds to a point 100 where the value $T_{SA}$ stored in the RAM 58 is loaded into the down counter 60, and the program then proceeds to the point 98 where the processing of interrupt is finished.

As the value $T_{SA}$ is loaded, the down counter 60 operates to reduce the value $T_{SA}$ in synchronism with predetermined clock pulses, as shown in the diagram (C) of FIG. 5. When its contents becomes zero, the down counter 60 requests interrupt to the CPU 38. Responsive to the request of interrupt, the CPU 38 executes the processing as shown in FIG. 4c. Namely, when an interrupt takes place at a point 102, current-carrying signals which had hitherto been allowed to flow are interrupted at a point 104, and then the program proceeds to a point 106 to finish the processing of interrupt. Therefore, the current-carrying signals which had been supplied to the ignition device 64 via the output interface 62 are turned off at this moment as shown in the diagram (D) of FIG. 5, and the electric current is interrupted from flowing into the ignition coil of the ignition device 64. Accordingly, the spark is produced at this moment as shown in the diagram (E) of FIG. 5.

When the engine is judged to be in the idling condition at the point 84 in the routine of FIG. 4a, the program proceeds to a point 108 where an instruction voltage given by the circuit 50 is subjected to the analog-to-digital conversion to obtain a digital data $a$. Then, at a point 110, the CPU 38 determines, using the thus obtained digital data $a$, a parameter $\gamma$ for advancing the fixed angle during the idling. If the digital data $a$ is given by eight bits, and the parameter $\gamma$ is given by upper three bits, the required bits $\beta$ can be calculated from $a.\text{AND}.11100000 \rightarrow \beta$. Then, the parameter $\gamma$ is obtained by shifting the $\beta$ toward the right by five bits. Thereafter, at a step 112, the CPU 38 selects a value of fixed angle advancement from the above-mentioned parameter $\gamma$. That is, an initial address in a predetermined region of the ROM 56 which stores a plurality of setting values of fixed angle advancements for idling the engine and the above-mentioned parameter $\gamma$ are added together, then, the content stored in the ROM 56 is read out in accordance with the added result as an address, and the thus read content is utilized as a fixed angle advancement. For example, if setting values of fixed angle advancement as shown in Table 2 are stored in the above-mentioned region of the ROM 56; a fixed angle advancement a will be 4° when the above-mentioned parameter γ is "011". After the fixed angle advancement a has been obtained, the ignition timing is controlled in the same manner as mentioned earlier.

Although at the point 112 in the embodiment of FIG. 3, the CPU 38 utilizes the parameter γ as an address data, it is also allowable to deal with the parameter γ as a physical quantity in order to finally obtain a fixed angle advancement by arithmetically calculating the parameter γ together with a sole constant which is stored in a predetermined region in the ROM 56 for obtaining a fixed angle advancement.

In the embodiment of FIG. 3, furthermore, both the operation for subjecting the instruction voltage to the A/D conversion and the operation for obtaining the fixed angle advancement from the digital data, are performed in the main routine. These operations, however, can be carried out in the interrupt routine. Furthermore, these operations can also be carried out in the main routine or in the interrupt routine after every several seconds by a timer which is governed by a software technique. In this case, the results of the operation will be stored in the RAM or the like. It is further allowable to perform these operations in the initial routine and so store the results in the RAM or the like. Furthermore, the operation for subjecting the instruction voltage to the analog-to-digital conversion may be effected in the initial routine while storing the resultant digital data in the RAM or the like, and the operation for obtaining a fixed angle advancement from the digital data may be performed in the main routine or in the interrupt routine.

Referring to FIG. 3, the invention is applied to the case when a value of fixed angle advancement is to be specified while the engine is in the idling condition. The invention, however, can be applied to specify various other data used in the arithmetic calculations that will vary in the system for controlling the ignition timings. Further, not only limited to the system for controlling the ignition timings, the invention can also be applied for specifying the data used in the arithmetic calculations in the system for controlling the fuel injection, in the system for controlling the secondary air, in the system for controlling the exhaust gas recirculation, and in other systems for controlling the operation of the engine. When applied to the system for controlling the fuel injection, for example, a skip value, a time constant, a delay time, and the like which constitute correction coefficients can be specified in the system which controls the feedback of air-fuel ratio.

According to the present invention as illustrated in detail in the foregoing, the data used in the arithmetic calculation can be varied very easily by simply changing the instruction voltage without the need of replacing the ROM, and without requiring any additional time or extra expense. Consequently, the present invention will present a very great advantage for the automotive industry.

As many widely different embodiments of the present invention may be constructed without departing from the spirit and scope of the present invention, it should be understood that the present invention is not limited to the specific embodiments described in this specification, except as defined in the appended claims.

We claim:

1. A method of controlling the operation of an internal combustion engine having a storage means for preliminarily storing a plurality of constant values in the form of binary numbers for use in an arithmetic calculation, and a voltage instructing means for generating an instruction voltage, said method comprising the steps of:

detecting the actual operating condition of said engine and producing at least one first electrical signal in the form of a binary number related thereto;

setting the instruction voltage generated by said voltage instructing means before operating said engine and maintaining the instruction voltage constant during engine operation, said setting step being performed independently of said detecting and producing step;

converting said set instruction voltage generated by said voltage instructing means into a second electrical signal in the form of a binary number;

determining a calculation coefficient by processing one of said constant values stored in said storage means in accordance with said second electrical signal; arithmetically calculating at least one value corresponding to a setting for adjusting the operation of said engine from said first electrical signal and said calculation coefficient; and controlling the operation of said engine in response to said value corresponding to the setting.

2. A method as claimed in claim 1, wherein said determining step includes a step of selecting said one of said constant values from said storage means in accordance with said second electrical signal, said selected constant value being used as said calculation coefficient.

3. A method as claimed in claim 2, wherein said second electrical signal is composed of a plurality of bits and a part of said bits of said second electrical signal is used for determining said calculation coefficient.

4. A method as claimed in claim 1, wherein said determining step includes steps of: calculating said calculation coefficient from said one of said constant values and said second electrical signal.

5. A method as claimed in claim 4, wherein said second electrical signal is composed of a plurality of bits and a part of said bits of said second electrical signal is used for determining said calculation coefficient.

6. An apparatus for controlling the operation of an internal combustion engine, comprising:

means for detecting the actual operating condition of said engine and for producing at least one first electrical signal indicating said detected operating condition of said engine;

storage means for preliminarily storing a plurality of constant values;

voltage instructing means for generating an instruction voltage which was predetermined before operating said engine and maintaining said instruction voltage constant during engine operation, said voltage instructing means operating independently of said detecting means;

means for converting said predetermined instruction voltage generated by said voltage instructing means into a second electrical signal in binary form;

processing means for (1) determining a calculation coefficient by processing one of said constant values stored in said storage means in accordance with said second electrical signal, and (2) arithmetically calculating at least one value corresponding to a setting for adjusting the operation of said engine from said first electrical signal and said calculation coefficient; and means for controlling the operation of said engine in response to said value corresponding to the setting.

7. Apparatus as claimed in claim 6, wherein said processing means selects said one of said constant values from said storage means in accordance with said second electrical signal, said selected constant value being used as said calculation coefficient.

8. An apparatus as claimed in claim 7, wherein said second electrical signal is composed of a plurality of bits and a part of said bits of said second electrical signal is used for determining said calculation coefficient.

9. Apparatus as claimed in claim 6, wherein said processing means calculates said calculation coefficient from said one of said constant values and said second electrical signal.

10. An apparatus as claimed in claim 9, wherein said second electrical signal is composed of a plurality of bits and a part of said bits of said second electrical signal is used for determining said calculation coefficient.

* * * * *